(12) United States Patent
Lynas et al.

(10) Patent No.: US 9,440,728 B2
(45) Date of Patent: Sep. 13, 2016

(54) AIRCRAFT FUEL TANK SYSTEM

(75) Inventors: Christopher Lynas, Bristol (GB);
Peter William James, Bristol (GB);
Robert A Melville, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 1085 days.

(21) Appl. No.: 12/870,496

(22) Filed: Aug. 27, 2010

(65) Prior Publication Data

US 2011/0049173 A1 Mar. 3, 2011

(30) Foreign Application Priority Data

Sep. 3, 2009 (GB) .................................. 0915353.7

(51) Int. Cl.
*B65D 90/22* (2006.01)
*B64C 3/34* (2006.01)
*B64D 37/32* (2006.01)

(52) U.S. Cl.
CPC ................. *B64C 3/34* (2013.01); *B64D 37/32* (2013.01)

(58) Field of Classification Search
CPC ........ B64C 3/34; B64D 37/02; B64D 37/30; B64D 37/14; B64D 37/20

USPC ............................. 220/564, 562; 244/135 C
See application file for complete search history.

(56) References Cited

U.S. PATENT DOCUMENTS

| | | | | |
|---|---|---|---|---|
| 3,788,039 A * | 1/1974 | Bragg | ............................. | 96/174 |
| 4,013,190 A * | 3/1977 | Wiggins et al. | .............. | 220/501 |
| 4,760,978 A * | 8/1988 | Schuyler et al. | ......... | 244/134 D |
| 6,105,676 A * | 8/2000 | Alhamad | ........................ | 169/45 |
| 6,216,791 B1 | 4/2001 | Alhamad | | |
| 2001/0042628 A1 | 11/2001 | Alhamad | | |
| 2009/0314783 A1* | 12/2009 | Losinski et al. | .............. | 220/530 |

FOREIGN PATENT DOCUMENTS

| | | |
|---|---|---|
| EP | 1591359 A1 | 11/2005 |
| GB | 2008521 A | 6/1979 |

OTHER PUBLICATIONS

Search Report for GB0915353.7 issued Dec. 22, 2009.

* cited by examiner

*Primary Examiner* — Anthony Stashick
*Assistant Examiner* — Robert Poon
(74) *Attorney, Agent, or Firm* — Hauptman Ham, LLP (57) ABSTRACT

An aircraft fuel tank system is disclosed in which a vent tank is provided with a compact vent pipe comprising one or more built-in flame barrier elements providing high liquid fuel outflow rate.

20 Claims, 10 Drawing Sheets

AIRCRAFT FUEL TANK SYSTEM

RELATED APPLICATIONS

The present application is based on, and claims priority from, Great Britain Application Number 0915353.7, filed Sep. 3, 2009, the disclosure of which is hereby incorporated by reference herein in its entirety.

FIELD OF INVENTION

The present invention relates to an aircraft fuel tank system.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refuelling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

An embodiment of the invention provides an aircraft fuel tank system comprising:

a vent tank comprising an inlet from one or more fuel tanks and an ullage vent means in a lower surface of the tank, the vent tank being arranged to provide a predetermined maximum fuel capacity and having a minimal ullage at the maximum fuel capacity;

a vent pipe having a first open end in fluid communication with the ullage vent means and a second open end positioned within the minimal ullage of the vent tank, the vent pipe being arranged to provide a substantially direct nominally vertical fluid flow path between the minimal ullage and the ullage vent means; and flame barrier means arranged within the vent pipe so as to provide a barrier to ingress to the vent tank of a flame front external to the vent tank and to enable egress of liquid fuel from the vent tank though the ullage vent means via the vent pipe.

The flame barrier means may be arranged in one or more planes oblique to the vertical axis of the vent pipe. The flame barrier means may extend over the breadth of the vent pipe. The flame barrier means may extend over substantially the whole cross-sectional area of the vent pipe. The flame barrier means may be arranged to present a corrugated surface to the liquid fuel egress. The flame barrier means may be arranged to present two or more planar surfaces to the liquid fuel egress. The flame barrier means may be arranged to present one or more concave surfaces to the liquid fuel egress. The flame barrier means may be arranged to present one or more convex surfaces to the liquid fuel egress. The flame barrier means may be arranged to present one or more at least part cone shaped surfaces to the liquid fuel egress.

The vent pipe may be arranged with a substantially uniform cross section along the length of the vent pipe. The vent pipe may be arranged with cross section that conforms with the ullage vent means. The vent pipe may be arranged with a cross section that tapers along its length. The taper of the vent pipe may be arranged to substantially follow a taper of the flame barrier means. The flame barrier means may be arranged to provide a barrier to ingress of a flame front at ambient pressure. The flame barrier means may be arranged to enable egress of liquid fuel from the vent tank though the ullage vent means via the vent pipe at refuelling pressure. The vent duct means may be provided with ice screen means. The vent duct may be in communication with atmosphere via a low aerodynamic drag duct.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
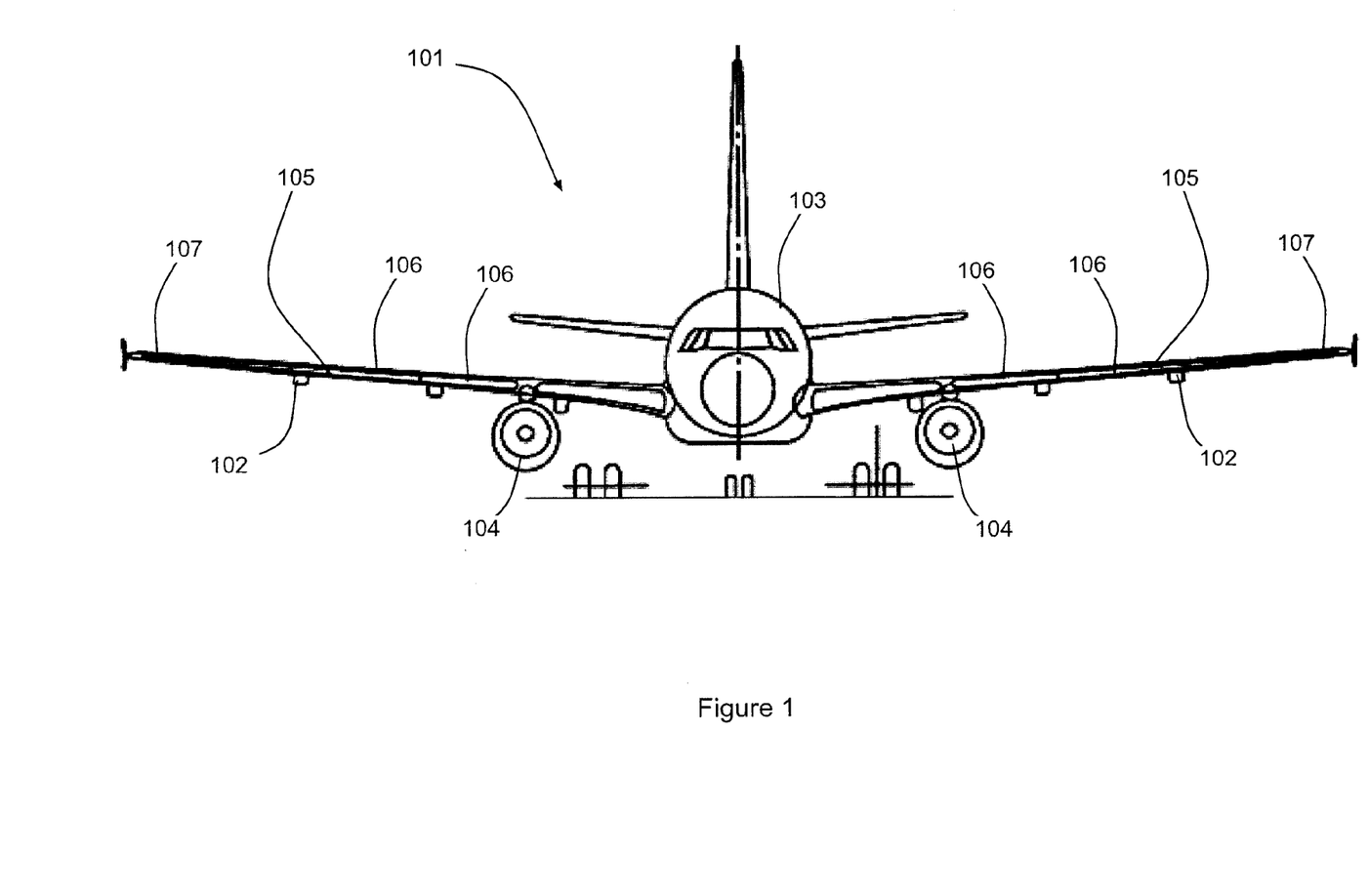
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system comprises a set of fuel tanks 106 and two vent tanks 107 each built-in to a respective one of the wings 102. The vent tanks 107 are each located towards the tip of their respective wings 102. The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of, for example, fuel being burned by the engines 104, fuel jettison, de-fuel or a decrease in altitude of the aircraft 101. Secondly, the vent tanks 107 vent the ullage of each of the fuel tanks 106 to atmosphere to enable the egress of positive pressure of air, fuel vapour, inerting gasses or a mixture of these from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refuelling process.

Figure 2:
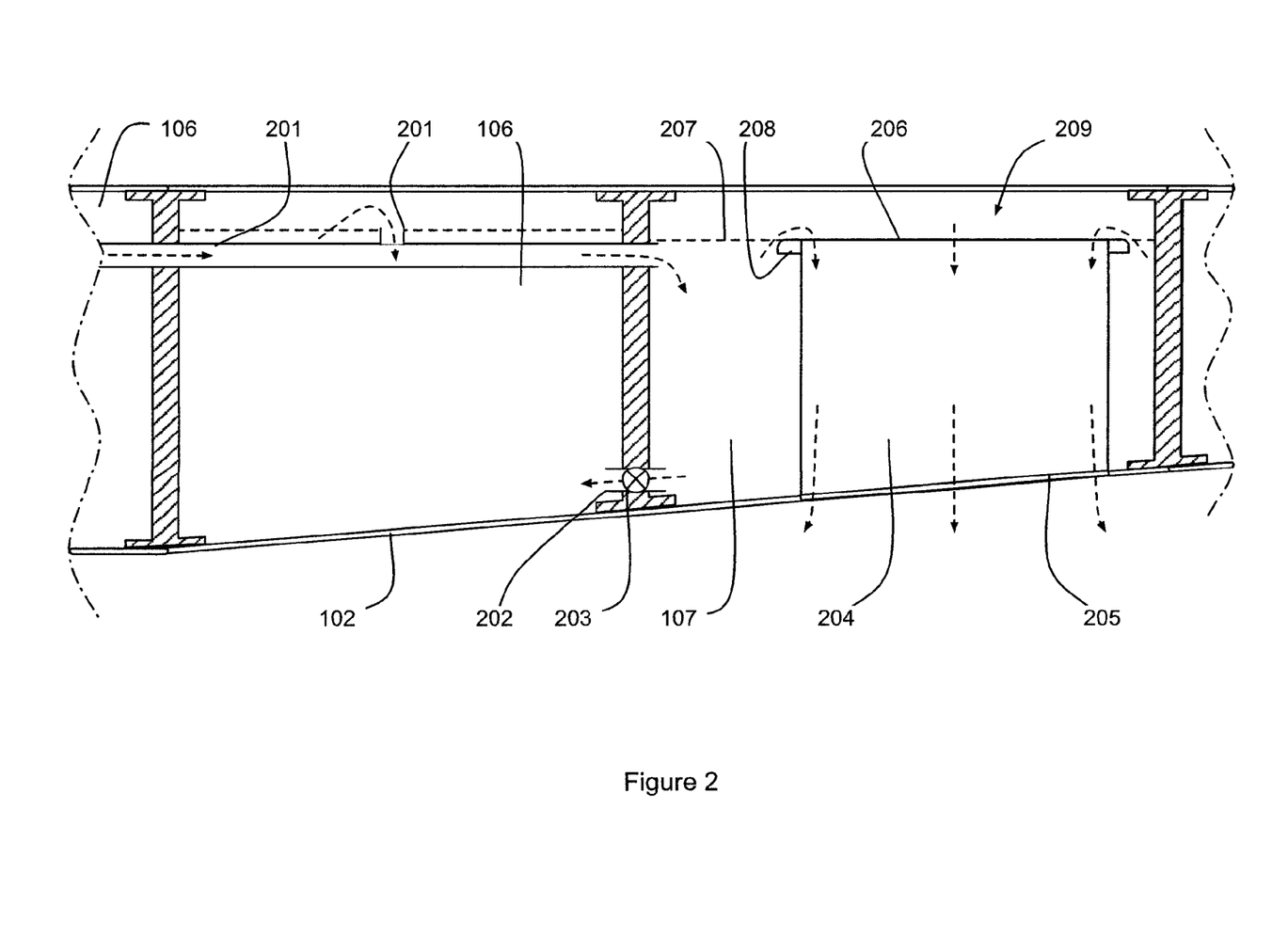
FIG. 2 is a schematic cross-sectional front view of a vent tank in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises a vent pipe 204 arranged to provide fluid communication between the interior of the vent tank 107 and atmosphere via an ullage vent 205 positioned in the lower wall of the vent tank 107 and the aircraft wing 102. In the present embodiment, the vent pipe 204 is cylindrical and arranged generally vertically within the vent tank 107 when the aircraft 101 is level on the ground. As will be understood by those skilled in the art, there may be significant changes in the orientation of the wing 102 depending on whether the aircraft 101 is on level or non-level ground or the aircraft 101 is in flight. Furthermore, whether or not the fuel tank system is full or empty will further influence the orientation of the wing 102. The vent pipe 204 has its lower open end in direct fluid communication with the ullage vent 205 and its upper open end 206 positioned level with the maximum designed liquid fuel level 207 of the vent tank 107. In the present embodiment, the upper end of the vent pipe 204 is provided with a lip 208 arranged to improve the flow of liquid around the upper end of the vent pipe 204 relative to a plain-ended pipe. The space in the vent tank 107 above the maximum designed fuel level 207 is the minimal ullage 209 in normal conditions, that is, the non-overflow condition. Thus, in use, when liquid fuel from the fuel tanks 106 fills the vent tank 107 past its maximum designed liquid fuel level 207, the liquid fuel overflows the lip 208 and flows down the vent pipe 204 into the atmosphere via the ullage vent 205.

Figure 3:
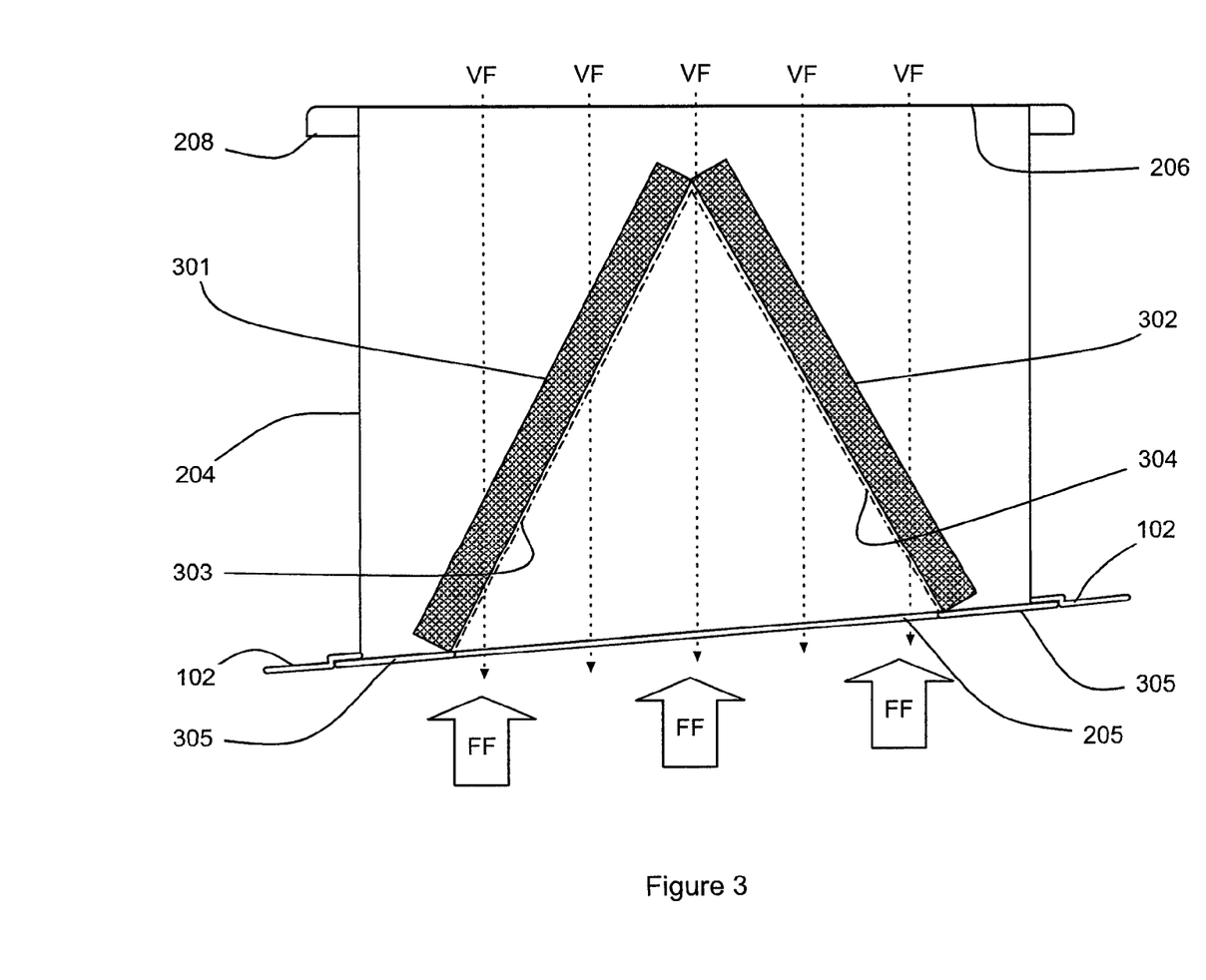
FIG. 3 is a schematic cross-sectional view a vent pipe in the vent tank of FIG. 2.

With reference to FIG. 3, the vent pipe 204 further comprises flame barrier means in the form of two flame barrier elements 301, 302. In the present embodiment, the flame barrier elements 301, 302 are planar and arranged at an oblique angle to the direction of the flow of vented fuel (VF) down the vent pipe 204 from the vent tank 107. In the cross-section of FIG. 3, the flame barrier means 301, 302 extends across substantially the whole diameter of the vent pipe 204. The flame barrier means 301, 302 are arranged so as to not substantially interfere with direct vertical fluid flow path for liquid fuel from the vent tank 107 out of the ullage vent 205. The flame barrier means 301, 302 are arranged to resist the ingress into the vent tank 107 of a substantially ambient pressure flame front (FF) exterior to the wing 102. Such a flame front (FF) may wash over the ullage vent 205 in the event of a ground fire during refuelling or other operation of the aircraft 101.

In the present embodiment, the flame barrier elements are formed from a conventional flame barrier material such as layered wire mesh. As will be understood by those in the art, the flame barrier may be formed from any suitable material such as non-woven meshes or may comprise one or more granular or particulate layers.

In the present embodiment, the vent pipe 204 further comprises an ice screen means in the form of two planar ice screen elements 303, 304. Each of the ice screen elements 303, 304 are dimensioned to cover the exterior face of a corresponding one of the flame barrier elements 301, 302. The ice screen elements 303, 304 are arranged to prevent the build up of ice on the flame barrier elements 301, 302 which, if allowed to occur could constrict the flow of fluid or vapour though the vent pipe 204.

In the present embodiment, the flame barrier and ice screen elements 301, 302, 303, 304 are fixed to a base plate 305. The base plate 305 is ring shaped and arranged to fit flush into the underside of the wing 102 so as to support the flame barrier and ice screen elements 301, 302, 303, 304 within the vent pipe 204. The aperture in the centre of the ring shaped base plate 305 defines the ullage vent 205. The base plate 305 provides a seal between the vent tank-side surfaces of the flame barrier elements 301, 302 and the exterior surfaces of the flame barrier elements 301, 302.

Figure 4:
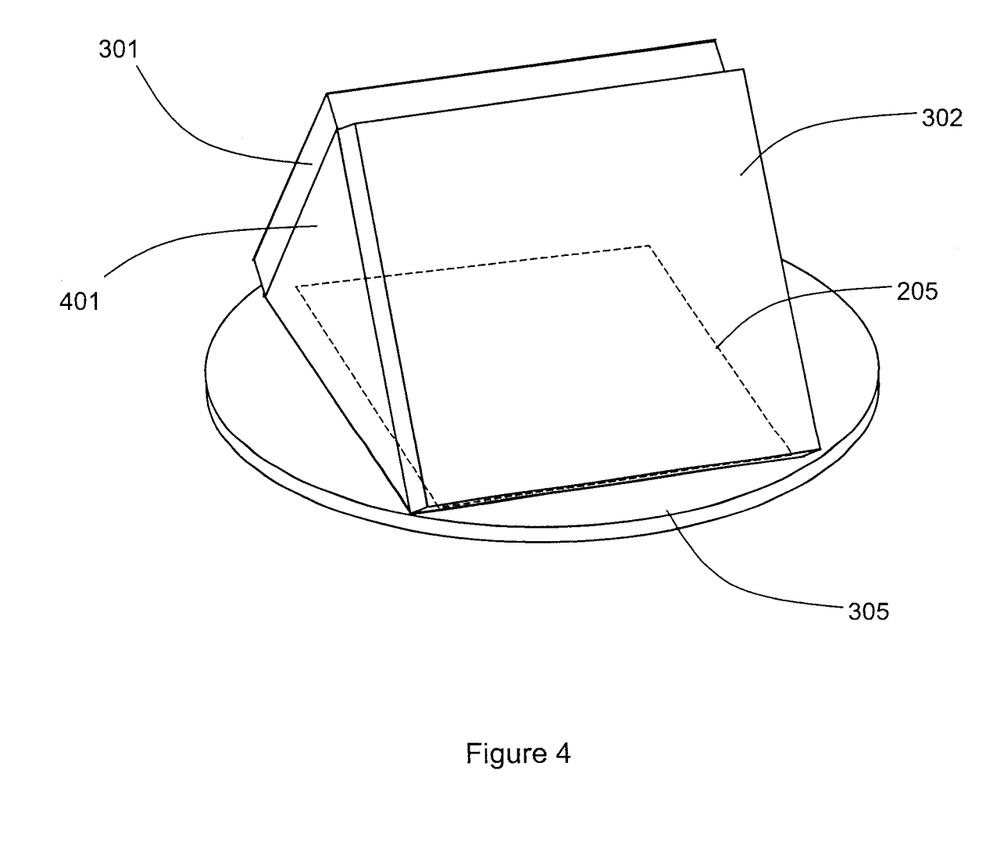
FIG. 4 is a schematic perspective view of a flame barrier element of the vent pipe of FIG. 3.

With reference to FIG. 4, in the present embodiment, each of the flame barrier elements 301, 302 is further supported on a pair of planar triangular impervious end walls 401 sealed to the base plate 305. The combination of the end walls 401, the base plate 305 and the flame barrier elements 301, 302 provide a complete flame barrier within the vent pipe 204 between the interior and the exterior of the vent tank 107 against the ingress of a flame front (FF).

In the present embodiment, given a vent pipe with a 250 mm cross section fitted with two flame barrier elements each 175 mm square and arranged as in FIG. 4, this arrangement will provide an area of approximately 0.0613 $m^2$ of planar flame barrier surface to liquid fuel vented from the vent tank 107. If the flame barrier elements were provided as a single disk normal to the central axis of a 250 mm vent pipe such an arrangement would provide an area of approximately 0.0491 $m^2$ of planar flame barrier surface. Thus the arrangement as shown in FIG. 4 provides approximately 25% additional surface area to a single disk normal to the central axis of the vent pipe.

Figure 5A:
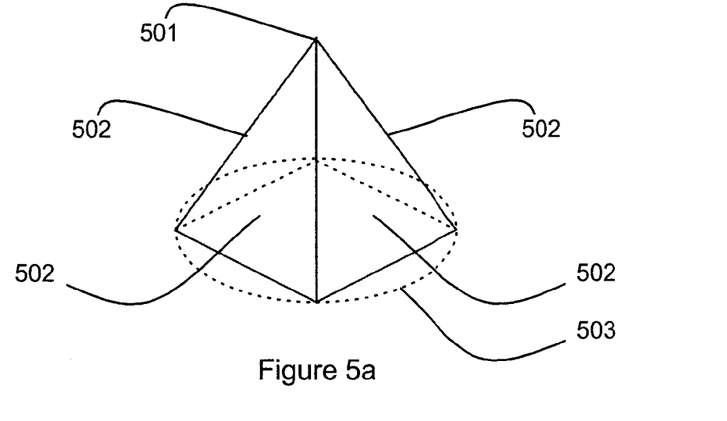
FIGS. 5a is a schematic perspective view of a flame barrier element arrangement in accordance with another embodiment.

With reference to FIG. 5a, in another embodiment, a flame barrier means 501 comprises four planar triangular flame barrier elements 502 arranged together as a pyramid and supported on a base plate 503 in the same manner as the embodiment described above with reference to FIG. 4. Given a circular vent pipe with a diameter of 250 mm and a flame barrier means 501 with a base length of 175 mm and a height of 180 mm, this arrangement would provide an area of approximately 0.0704 $m^2$ of planar flame barrier surface to liquid fuel vented from the vent tank 107.

Figure 5B:
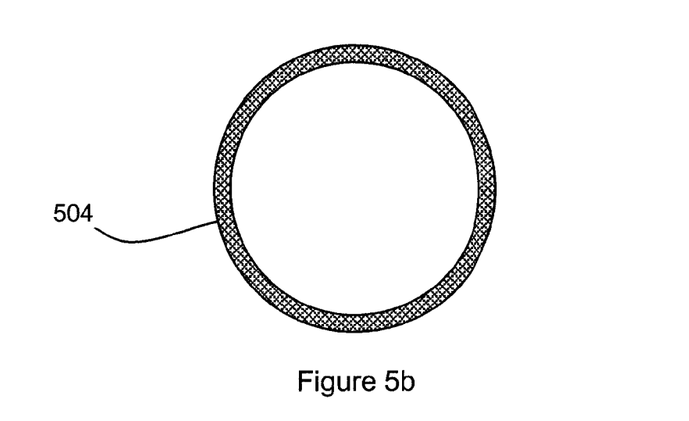
FIGS. 5b & 5c are cross-sectional views of flame barrier element arrangements in accordance with further embodiments.
Figure 5C:
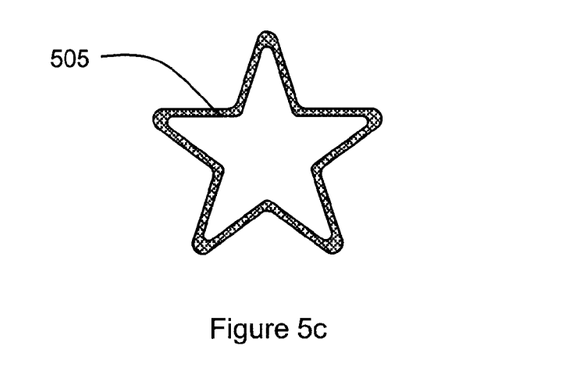

With reference to FIG. 5b, in a further embodiment, a flame barrier means 504, shown in cross section, comprises a single conical flame barrier element supported on a base plate (not shown). Given a circular vent pipe with a diameter of 250 mm and a flame barrier means 504 with a corresponding diameter and a height of 180 mm, this arrangement would provide a surface area of approximately 0.0860 $m^2$ of flame barrier surface to liquid fuel vented from the vent tank 107. With reference to FIG. 5c, in another embodiment, a flame barrier means 505, shown in cross section, comprises a single conical flame barrier element arranged with a radially corrugated surface. Thus, the cross section as shown in FIG. 5c is star shaped or lobed.

As will be understood by those in the art, the flame barrier means may comprise a single hemispherical or non-spherical dome shaped flame barrier element and may comprise a radially or circumferentially corrugated or lobed surface.

Figure 6:
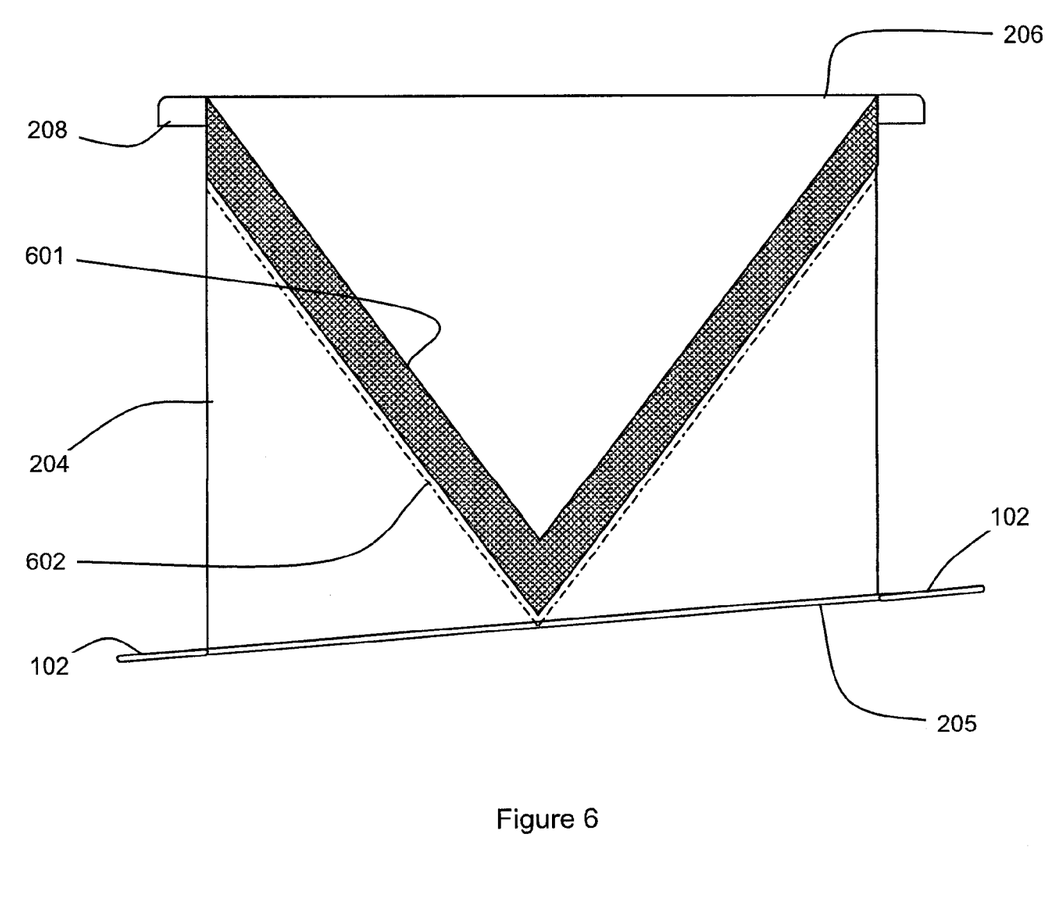
FIGS. 6 & 7 are cross-sectional views of vent pipes illustrating flame barrier elements in accordance with other embodiments.

With reference to FIG. 6, in a further embodiment, the flame barrier means comprises a single inverted conical flame barrier element 601, which, in the present embodiment, has a circular cross-section. The rim of the conical flame barrier element is supported on the interior wall of vent pipe 204 adjacent its upper open end 206. As a result, the ullage vent 205 is able to conform to the cross section of the vent pipe 204. An ice screen 602 is arranged to conform to the exterior conical surface of the flame barrier element 601. In the present embodiment, the interior cone surface of the flame barrier element 601 faces the flow of liquid fuel from the vent tank 107.

As will be understood by those skilled in the art, if a non-circular cross-sectioned flame barrier means is utilised in the inverted mode described above a top plate may be provided to blank any spaces or discrepancies between the non-circular cross-section and the cross-section of the vent pipe.

Figure 7:
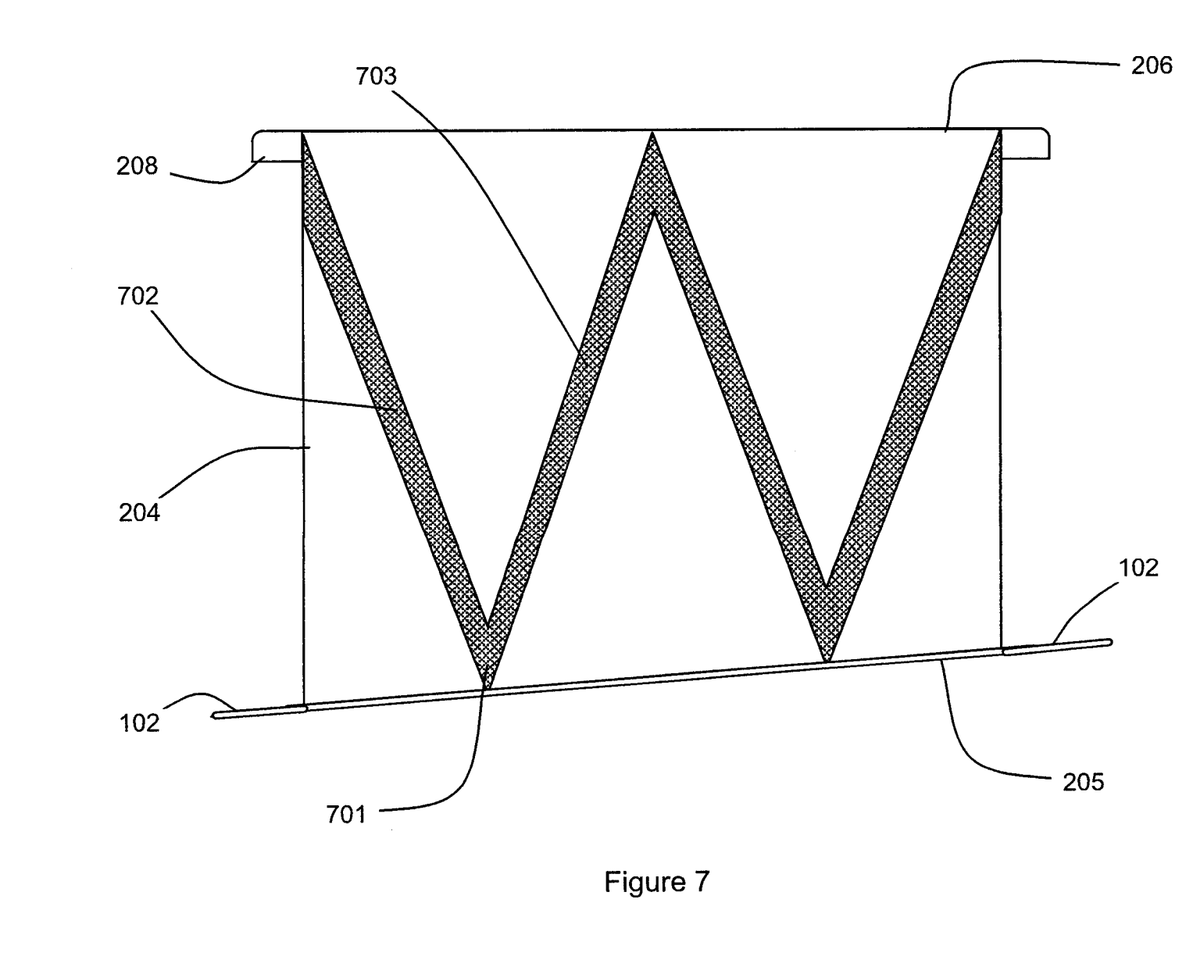

With reference to FIG. 7, in another embodiment, the flame barrier means comprises a semi-inverted cone shaped flame barrier element 701. In other words, only the base 702 of the cone is inverted relative to the head 703 of the cone thus providing a circumferentially corrugated cross-section relative to the central axis of the vent pipe 204. Given a vent pipe diameter of 250 mm and a height of 180 mm and thus a corresponding height of semi-inverted cone shaped, the flame barrier element 701 of the present embodiment would provide a surface area of approximately 0.1497 $m^2$ of flame barrier surface to liquid fuel vented from the vent tank 107. This is an increase of approximately 75% over the plain cone shaped flame barrier element 601 of FIG. 6 which would provide a surface area of approximately 0.0860 $m^2$.

Figure 8:
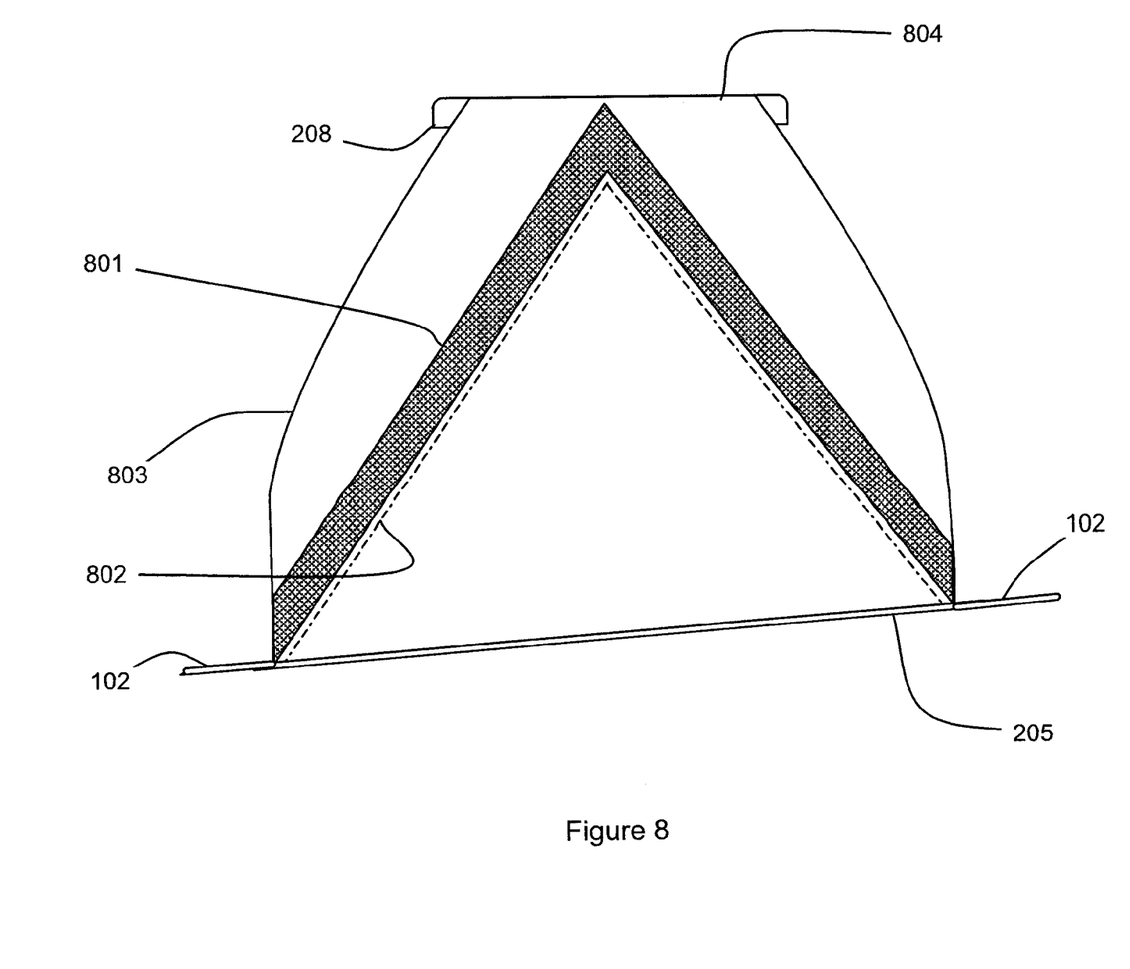
FIGS. 8 & 9 are cross-sectional views of vent pipes in accordance with further embodiments.

With reference to FIG. 8, in a further embodiment, the flame barrier means comprises a single upright conical flame barrier element 801 and an associated ice screen 802. The circular base of the flame barrier element 801 is supported on the interior wall of the vent pipe 803 adjacent the ullage vent 205. In the present embodiment, the vent pipe 803 is tapered inwardly in the upward direction so that the upper open end 804 of the vent pipe 803 is of a significantly smaller diameter than the end of the vent pipe 803 adjacent the ullage vent 205. The circular base of the conical flame barrier element 801 is fixed to the lower interior surface of vent pipe 803 adjacent ullage vent 205. The vent pipe 803 has an upwardly inwardly tapered cross section so as to reduce the overall volume occupied in the vent tank by the vent pipe 803. In other words, the vent pipe 803 is tapered in a direction that conforms with a tapering of the flame barrier element 801 so as to allow sufficient liquid fuel flow to the whole of the interior surface of the flame barrier element 801 while enabling the vent pipe 803 to be more compact.

Figure 9:
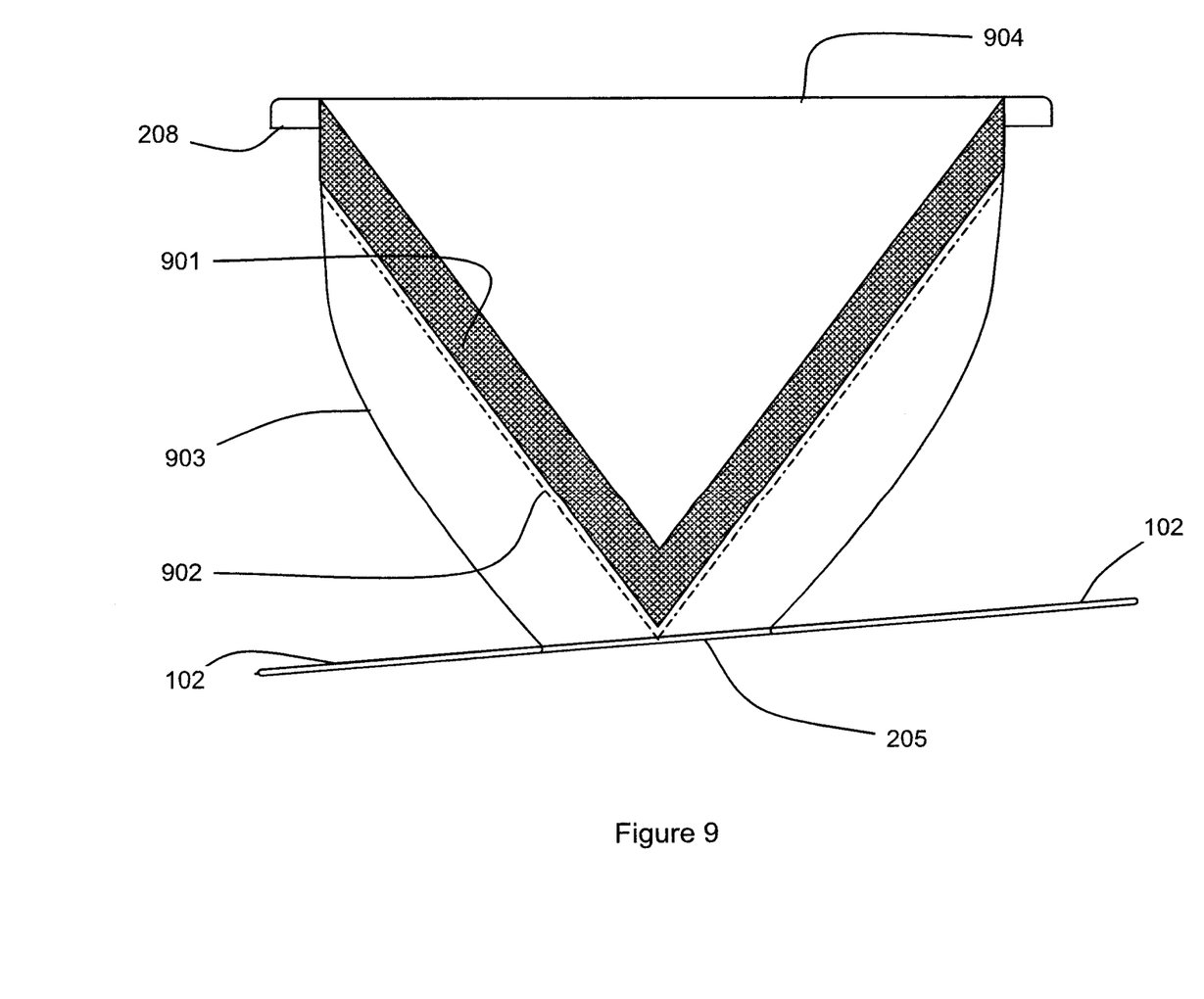

With reference to FIG. 9, in another embodiment, the flame barrier means comprises a single inverted conical flame barrier element 901 and an associated ice screen 902. The circular base of the flame barrier element 901 is supported on the interior wall of the vent pipe 903 adjacent the upper open end 904. In the present embodiment, the vent pipe 903 is tapered inwardly in the downward direction so that the upper open end 804 of the vent pipe 903 is of a significantly larger diameter than the end of the vent pipe 903 adjacent the ullage vent 205. The circular base of the conical flame barrier element 901 is fixed to upper interior surface of vent pipe 903. The vent pipe 903 has an upwardly outwardly tapered cross section so as to reduce the overall volume occupied in the vent tank by the vent pipe. In other words, the vent pipe 903 is tapered in a direction that conforms with a tapering of the flame barrier element 901 so as to allow sufficient liquid fuel flow from the whole of the exterior surface of the flame barrier element 901 while enabling the vent pipe 903 to be more compact. In the present embodiment, the tapered vent pipe enables the relative size of the ullage vent 205 to be reduced.

Figure 10:
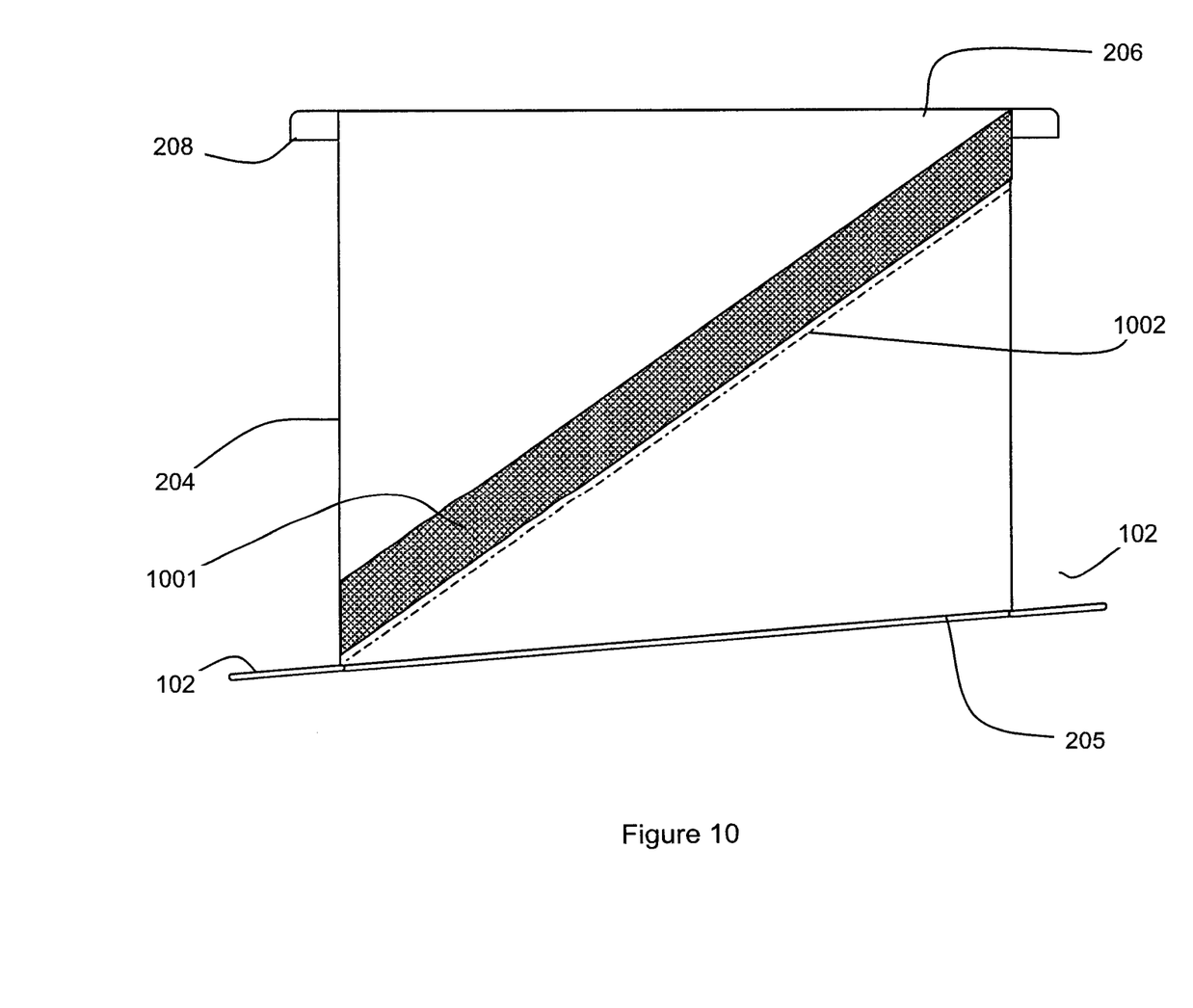
FIG. 10 is a cross sectional view of a vent pipe illustrating a flame barrier element in accordance with another embodiment.

With reference to FIG. 10, in a further embodiment, the flame barrier means comprises a single planar flame barrier element 1001 and an associated ice screen 1002. The flame barrier element 1001 is planar and arranged within the vent pipe 204 at an oblique angle relative to the central axis of the cylindrical vent pipe 204. The flame barrier element 1001 extends across the whole cross section of the vent pipe 204. Thus, the flame barrier element 1001 is oval when projected normal to its single planar surface. The flame barrier element 1001 provides a single planar surface at an oblique angle to the flow of fluid down the vent pipe 204.

As will be understood by those in the art, any surface of one or more of the flame barrier elements may be corrugated or be formed with a convoluted cross section. Such corrugations or convolutions may run in any suitable direction through the flame barrier elements. For example, the corrugations or convolutions may run radially or circumferentially relative to the central axis of the vent pipe.

As will be understood by those in the art, the ice screen need not conform to exterior of the flame barrier mean. For example, the ice screen may be planar and placed across ullage vent. In some embodiments, where environmental conditions or regulations allow, the ice screen may be omitted.

As will be understood by those in the art, the flame barrier means may be integral with vent pipe or removable for replacement or inspection. The flame barrier means may be removably secured within the vent pipe by any suitable arrangement such as a retaining ring or plate, or bayonet or threaded attachment.

As will be understood by those in the art, the ullage vent may be fed by or feed into an aerodynamic duct, such as a NACA (National Advisory Committee for Aeronautics) duct or the like, for providing an aerodynamic interface between the ullage vent and the external surface of the aircraft.

Embodiment of the invention may provide more compact vent pipe and flame barrier arrangements either by providing more efficient flame barrier elements so as to increase the flow rate of liquid fuel per unit area of the normal cross section of the vent pipe or by modifying the form of the vent pipe itself so as to be more space efficient. A flame barrier with a larger available surface area reduces the pressure drop in the vent pipe and hence enables either higher liquid fuel flow rates or a smaller size of vent pipe for the equivalent pressure drop.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. An aircraft fuel tank system comprising:
   one or more aircraft fuel tanks for holding and supplying aircraft fuel to aircraft engines within said aircraft;
   an aircraft vent tank comprising an inlet connected to said one or more fuel tanks and an ullage vent means in a lower surface of said aircraft fuel tank, said aircraft vent tank being arranged to provide a predetermined maximum fuel capacity and having a minimal ullage at said maximum fuel capacity;
   a vent pipe having a first open end in fluid communication with said ullage vent means and a second open end positioned within said minimal ullage of said aircraft vent tank, said vent pipe being arranged to provide a substantially direct nominally vertical fluid flow path between said minimal ullage and said ullage vent means; and
   flame barrier means arranged within said vent pipe so as to provide a barrier to ingress to said vent tank of a flame front external to said vent tank and to enable egress of liquid fuel from said vent tank though said ullage vent means via said vent pipe.

2. An aircraft fuel tank system according to claim 1 in which said flame barrier means extends over substantially the whole cross-sectional area of said vent pipe.

3. An aircraft fuel system according to claim 1 in which said flame barrier means is arranged to present one or more concave surfaces to said liquid fuel egress.

4. An aircraft fuel system according to claim 1 in which said flame barrier means is arranged to present one or more convex surfaces to said liquid fuel egress.

5. An aircraft fuel system according to claim 1 in which said flame barrier means is arranged to present one or more at least part cone shaped surfaces to said liquid fuel egress.

6. An aircraft fuel system according to claim 1 in which said vent pipe is arranged with a substantially uniform cross section along the length of said vent pipe.

7. An aircraft fuel system according to claim 1 in which said vent pipe is arranged with cross section that conforms with said ullage vent means.

8. An aircraft fuel system according to claim 1 in which said vent pipe is arranged with a cross section that tapers along its length.

9. An aircraft fuel system according to claim 8 in which said taper of said vent pipe is arranged to substantially follow a taper of said flame barrier means.

10. An aircraft fuel system according to claim 1 in which said flame barrier means is arranged to provide a barrier to ingress of a flame front at ambient pressure.

11. An aircraft fuel system according to claim 1 in which said flame barrier means is arranged to enable egress of liquid fuel from said vent tank though said ullage vent means via said vent pipe at refuelling pressure.

12. An aircraft fuel system according to claim 1 in which a vent duct means is provided with ice screen means.

13. An aircraft fuel system according to claim 1 in which a vent duct is in communication with atmosphere via a low aerodynamic drag duct.

14. An aircraft fuel tank system according to claim 1 wherein said flame barrier means is arranged in one or more planes oblique to the vertical axis of said vent pipe.

15. An aircraft fuel tank system according to claim 1 wherein said flame barrier means extends over the breadth of said vent pipe.

16. An aircraft fuel tank system according to claim 1 wherein said flame barrier means extends over substantially the whole cross-sectional area of said vent pipe.

17. An aircraft fuel tank system according to claim 1 wherein said flame barrier means is arranged to present a corrugated surface to said liquid fuel egress.

18. An aircraft fuel system according to claim 1 wherein said flame barrier means is arranged to present two or more planar surfaces to said liquid fuel egress.

19. An aircraft fuel tank system comprising:
   an aircraft fuel tank for holding and supplying aircraft fuel to aircraft engines within said aircraft;
   an aircraft vent tank comprising an inlet to said aircraft fuel tank and an ullage vent means in a lower surface of said aircraft fuel tank, said aircraft vent tank being arranged to provide a predetermined maximum fuel capacity and having a minimal ullage at said maximum fuel capacity;
   a vent pipe having a first open end in fluid communication with said ullage vent means and a second open end positioned within said minimal ullage of said aircraft vent tank, said vent pipe being arranged to provide a substantially direct nominally vertical fluid flow path between said minimal ullage and said ullage vent means; and
   flame barrier means arranged within said vent pipe so as to provide a barrier to ingress to said aircraft vent tank of a flame front external to said aircraft vent tank and to enable egress of liquid fuel from said aircraft vent tank though said ullage vent means via said vent pipe, and wherein said flame barrier means is arranged in one or more planes oblique to the vertical axis of said vent pipe.

20. An aircraft fuel tank system comprising:
   an aircraft fuel tank for holding and supplying aircraft fuel to aircraft engines within said aircraft;
   an aircraft vent tank comprising an inlet to said fuel tank and an ullage vent means in a lower surface of said aircraft fuel tank, said aircraft vent tank being arranged to provide a predetermined maximum fuel capacity and having a minimal ullage at said maximum fuel capacity; a conduit connecting said vent tank with said aircraft fuel tank, and a pump having a non-return valve for controlling fuel flow from the vent tank to the fuel tank;
   a vent pipe having a first open end in fluid communication with said ullage vent means and a second open end positioned within said minimal ullage of said aircraft vent tank, said vent pipe being arranged to provide a substantially direct nominally vertical fluid flow path between said minimal ullage and said ullage vent means; and
   flame barrier means arranged within said vent pipe so as to provide a barrier to ingress to said aircraft vent tank of a flame front external to said aircraft vent tank and to enable egress of liquid fuel from said aircraft vent tank though said ullage vent means via said vent pipe, and wherein said flame barrier means is arranged in one or more planes oblique to the vertical axis of said vent pipe.

\* \* \* \* \*